G. H. PERKINS.
Soldering-Iron Heaters.
No. 150,352.  Patented April 28, 1874.
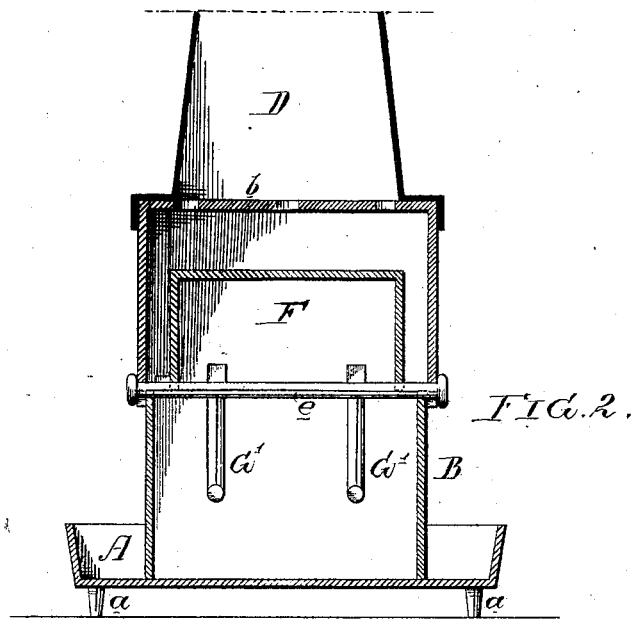
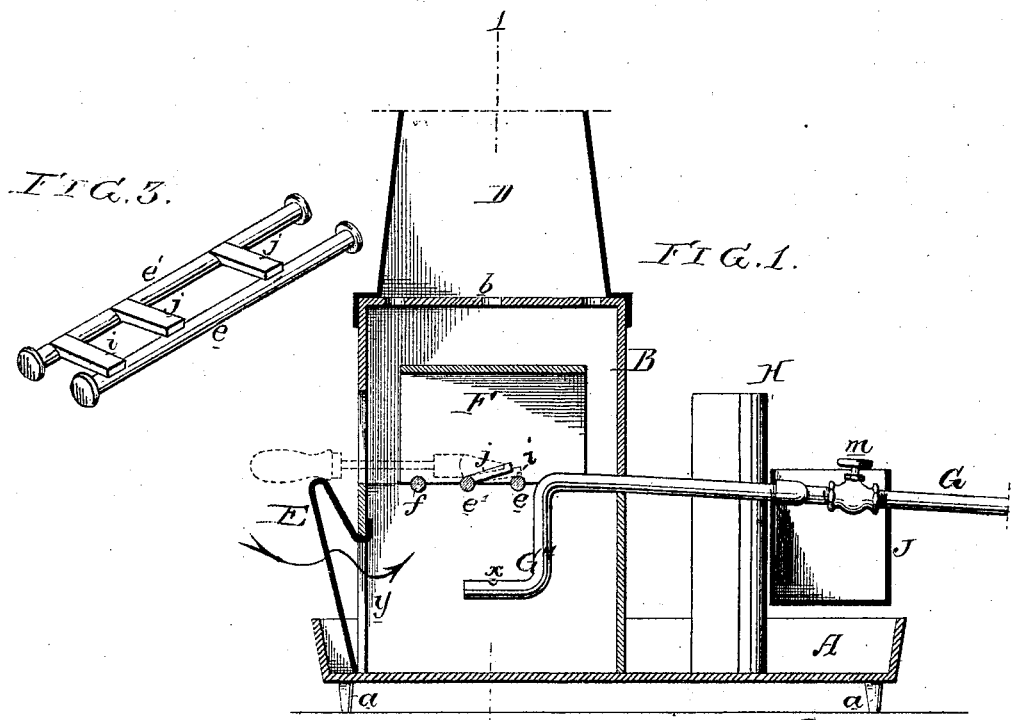
Witnesses, Hubert Howson
Harry Smith
George H. Perkins
By his Attys.
Howson and Son

UNITED STATES PATENT OFFICE.

GEORGE H. PERKINS, OF PHILADELPHIA, PENNSYLVANIA, ASSIGNOR TO HIMSELF, JOSEPH LE COMTE, OF NEW YORK CITY, AND ATLANTIC REFINING COMPANY, OF PHILADELPHIA, PENNSYLVANIA.

IMPROVEMENT IN SOLDERING-IRON HEATERS.

Specification forming part of Letters Patent No. 150,352, dated April 28, 1874; application filed February 21, 1874.

*To all whom it may concern:*

Be it known that I, GEORGE H. PERKINS, of Philadelphia, Pennsylvania, have invented an Improved Apparatus for Heating Soldering-Irons, of which the following is a specification:

The object of my invention is to heat soldering-irons by the use of benzine or other petroleum-spirit as a fuel, and this object I attain by the apparatus shown in the vertical section, Figure 1, of the accompanying drawing, and in the transverse vertical section, Fig. 2, on the line 1 2 of Fig. 1.

On a cast-iron tray, A, supported on legs, $a$, is placed a casing, B, having a perforated top, $v$, surmounted with a tube, D, through which, and through pipes connected with it, the gases may be conveyed to the external air. Tubes G G, communicating with an elevated tank containing benzine, pass through the casing B, within which they are bent downward and then horizontally, so as to become the burners G', each horizontal portion of the burner having, at a short distance from its closed end, a small hole, $x$, through which benzine vapor can escape in the condition of a flame of intense heat. The casing B is made in two parts, at the junction of which, with each other, both parts are notched for the reception of bars $e$ $e'$ and $f$, for supporting the soldering-irons, the handles of which rest on the upper rounded end of a bent plate, E, secured to the casing B, as shown in Fig. 1, and more particularly referred to hereafter. The bar $e'$ has three arms, $i$ and $jj$, the arm $i$ resting on the adjoining bar $e$, and maintaining the other arms free from contact with the same bar, and in the inclined position shown in Fig. 1, and perspective view, Fig. 3. The arms $jj$ are situated directly above the openings $x$ in the burners, and serve to deflect or spread the flames issuing from the same, which insures a more perfect combustion of the benzine than if it were permitted to pass upward uninterruptedly. The said arms $j$ also become red hot, and serve as a means of instantly re-igniting the benzine in case the flames should be suddenly extinguished, which will sometimes occur when the apparatus is in an exposed situation.

The object of raising the ends of the arms $j$ $j$ above the adjoining bar $e$ is to prevent the latter from interrupting the course of the flames toward the supply-pipes G, which I prefer to heat by means of the said flames, in order to vaporize the benzine before it emerges from the apertures $x$.

I prefer to use the arm $i$ as a means of elevating the arms $j$ above the bar $e$, but other devices may be employed for the purpose.

The bent plate $e$, before referred to, serves not only as a support for the handle of the soldering-iron, but has a deflector for the air which enters the apparatus for the support of combustion, the said air passing around the ends of the plate and through a front opening, $y$, in the casing, as indicated by the arrow in Fig. 1, and being thus prevented from entering in sudden blasts and extinguishing the flames.

Above the bars which support the soldering-iron, and within the casing B, there is a shield or deflector, F, which retains the heat above the said soldering-irons and prevents its outward radiation to the discomfort of the operator.

The undue heating of the supply-pipe G, cock $m$, and tank J, for catching the drippings from the said cock, is prevented by a shield, H, interposed between the said tank and casing B of the aparatus.

I claim as my invention—

1. The arms $j$ $j$ secured to the bar $e'$, arranged directly above the burners G' and maintained free from contact with the adjoining bar $e$, all substantially as and for the purpose specified.

2. The bent plate E arranged at the front of the aparatus opposite the air-inlet $y$, substantially as and for the two-fold purpose specified.

In testimony whereof I have signed my name to this specification in the presence of two subscribing witnesses.

GEORGE H. PERKINS.

WM. A. STEEL,
HARRY SMITH.